(12) United States Patent
Speldrich

(10) Patent No.: US 7,730,793 B2
(45) Date of Patent: Jun. 8, 2010

(54) VENTURI FLOW SENSOR

(75) Inventor: Jamie W. Speldrich, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 214 days.

(21) Appl. No.: 11/941,685

(22) Filed: Nov. 16, 2007

(65) Prior Publication Data
US 2009/0139347 A1 Jun. 4, 2009

(51) Int. Cl.
*G01F 1/44* (2006.01)
(52) U.S. Cl. .................................. 73/861.63
(58) Field of Classification Search .......... 73/202, 73/861.52, 861.65, 861.63, 861.64
See application file for complete search history.

(56) References Cited

U.S. PATENT DOCUMENTS

| | | | |
|---|---|---|---|
| 4,428,231 A * | 1/1984 | Peloza | 73/202.5 |
| 4,856,328 A | 8/1989 | Johnson | 73/202 |
| 5,199,306 A * | 4/1993 | Hunter | 73/861.63 |
| 5,383,356 A | 1/1995 | Zurek et al. | 73/118.2 |
| 5,736,650 A | 4/1998 | Hiron et al. | 73/861.63 |
| 5,861,561 A * | 1/1999 | Van Cleve et al. | 73/861.52 |
| 6,378,380 B1 | 4/2002 | Kusters et al. | 73/861.63 |
| 6,546,812 B2 * | 4/2003 | Lewis | 73/861.63 |
| 7,261,003 B2 | 8/2007 | McDonald et al. | |
| 7,343,823 B2 * | 3/2008 | Speldrich | 73/861.65 |
| 2002/0100474 A1 | 8/2002 | Kellner et al. | 128/200.24 |

FOREIGN PATENT DOCUMENTS

JP 10-148552 A 6/1998

* cited by examiner

Primary Examiner—Jewel Thompson

(57) ABSTRACT

A venturi flow sensing method, system, and apparatus. A tube or chamber may be tapered from a larger to smaller diameter to create a venturi region within the tube or chamber. The venturi region causes a local increase in flow velocity. The change in velocity creates a local change in pressure which is, in turn, used to drive flow through a parallel bypass tube or chamber. Inside this bypass, a flow sensor can be located, and in some cases, a pressure sensor as well. The flow is then either exhausted back into the original tube or the bypass tube may alternatively dead end. In either case, flow can be measured without causing a significant overall pressure drop in the system.

18 Claims, 7 Drawing Sheets

VENTURI FLOW SENSOR

TECHNICAL FIELD

Embodiments are generally related to flow sensors. Embodiments are also related to the measurement of airflow and pressure. Embodiments additionally relate to the flow sensors utilized in medical applications.

BACKGROUND OF THE INVENTION

Medical devices such as ventilators and CPAP (Continuous Positive Airway Pressure) machines are designed to provide air to a patient to foster correct breathing. A ventilator, for example, is designed to move air in and out of a person's lungs to assist breathing mechanically (e.g., a life support machine). A similar device is a respirator, which is used to assist or control breathing. Other similar machines facilitate breathing in persons with an impaired diaphragm function. These and other mechanical breathing devices often require a significant pressure change in order to accurately measure airflow. Such pressure changes, however, are often uncomfortable for the patient and do not promote optimal fan performance.

Flow rate control is a key to maintaining the comfort of the patient and proper working order of the mechanical breathing device. The ability to control flow to a patient, during the operation of such mechanical devices, is critical not only during surgical procedures but also during routine medical operations and patient bed rest, particularly with patients who suffer from lung and/or heart disease.

Other devices, such as electronic flow controllers, may be utilized to maintain flow rate control. These types of devices, however, are often expensive. Many hospitals and medical facilities cannot afford or do not have access to such expensive machines. Generally, air flow sensing techniques require an adequate pressure drop in order to sense air flow. It is therefore believed that a solution to these problems involves the implementation of inexpensive yet efficient devices and components for the detection of flow. The embodiments disclosed herein address this problem by providing an improved flow sensor system, method and apparatus

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is therefore, one aspect of the present invention to provide an improved flow sensor method and system.

It is another aspect of the present invention to provide an improved method and system for sensing flow without causing a significant global pressure change.

It is yet another aspect of the present invention to provide an improved method and system for sensing flow in mechanical breathing machines without inducing a pressure change which may be uncomfortable to the patient and detrimental to the operation of the machine.

The aforementioned aspects of the invention and other objectives and advantages can now be achieved as described herein. A venturi flow sensor method and system are disclosed herein, which offers the ability to measure the flow rate through a chamber or tube without creating a significant system wide pressure change. The venturi flow sensor is generally configured from a main chamber, including a tapered venturi region, and a parallel bypass flow chamber connected to the main chamber by a tap. The venturi region creates a local increase in flow velocity, which in turn creates a local change in static pressure. This change can be utilized to drive flow through the bypass flow chamber, where a flow sensor is used to measure flow. Although a localized pressure change is created, the overall pressure drop in the system is very low.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate at least one embodiment of the present invention and are not intended to limit the scope of the invention.

Figure 1:
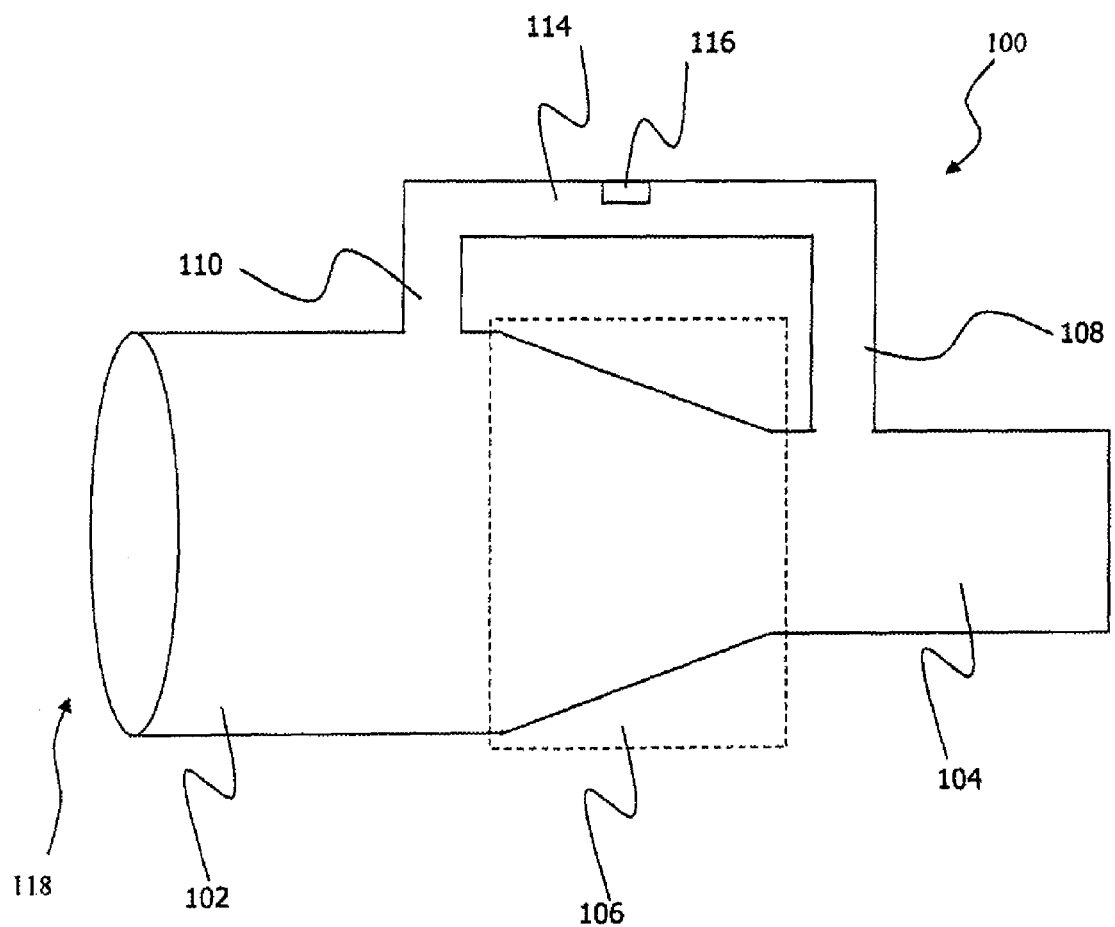
FIG. 1 illustrates a side view of a venturi flow sensor with a venturi flow chamber and an associated bypass flow chamber which exhausts back into the venturi flow chamber past the venturi region, in accordance with a preferred embodiment.

FIG. 1 illustrates a side view of one embodiment of a venturi flow sensor 100, which can be implemented in accordance with a preferred embodiment. Venturi flow sensor 100 consists of a cylindrically enclosed flow chamber 118 and a bypass flow chamber 114 connected to the cylindrically enclosed flow chamber 118 via taps 108 and 110. Cylindrically enclosed flow chamber 118 may be composed of three separate segments. Flow chamber 118's first segment 102 has a larger diameter than the last segment 104. In between segment 102 and 104 is a tapered venturi region 106 which tapers from the larger diameter of segment 102 to the smaller diameter of segment 106. This segment causes a venturi effect in cylindrically enclosed flow chamber 118 when a fluid is run through the chamber. In addition, within bypass flow chamber 114 is flow sensor 116. Notice that in this embodiment, tap 108 exhausts back into cylindrically enclosed flow chamber 118 downstream from venturi region 106.

A venturi is a region within a pipe, tube, or chamber where the diameter of the pipe is decreased from a larger to smaller diameter. The constriction in the pipe causes the local flow velocity to increase and creates a localized pressure change. Thus, the pressure change created by the increase in flow velocity can be used to drive flow through a bypass channel.

In a preferred embodiment of the present invention a micro-electromechanical system airflow sensor will be used as flow sensor 116. Micro-electromechanical system or "MEMS" devices are ultra-small in scale and used in a wide variety of ways. Most MEMS components range in size from micrometers to several millimeters. MEMS components may be used as gyroscopes, accelerometers, as well as a sensor of various physical phenomena. MEMS components are most often constructed of silicon, polymers, or metals and are generally constructed through deposition of thin film deposits.

In an alternative embodiment, flow sensor 116 can be implemented as any other sufficiently small airflow sensor. Examples of sensors that may serve such a purpose are vane meter sensors, hot wire sensors, or membrane sensors. These are intended only as examples of air flow sensors capable of serving the intended purpose. Any other sufficiently configured airflow sensor may also be used.

Figure 2:
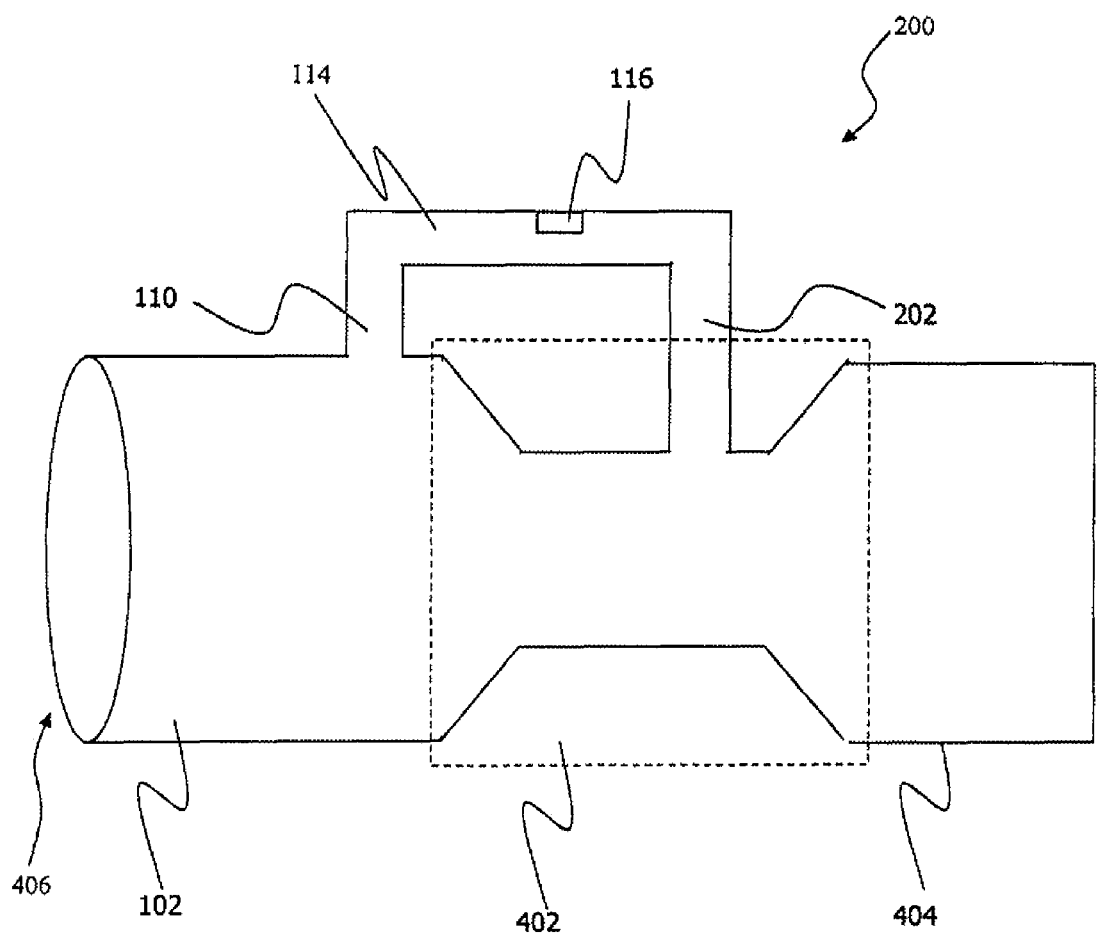
FIG. 2 illustrates a side view of a venturi flow sensor with a venturi flow chamber and an associated bypass flow chamber which exhausts into the venturi flow chamber in the venturi region, in accordance with an alternative embodiment.

FIG. 2 illustrates a venturi flow system 200, which can be implemented in accordance with an alternative embodiment. Venturi flow system 200 includes a cylindrically enclosed flow chamber 406 connected to bypass chamber 114 via taps 110 and 202. Cylindrically enclosed flow chamber 406 is comprised of three separate segments. The first segment 102 has a constant diameter. In the venturi segment 402 the initial larger diameter of the first segment 102, is tapered down to a minimum diameter and then increased back to the initial diameter of the first segment 102. The third segment 404 is thus returned to the initial larger diameter of the first segment 102.

Note that in FIG. 2, tap 202 can exhaust bypass flow chamber 114 into cylindrically enclosed flow chamber 406 at the venturi region 402. Note that in FIGS. 2-6 herein, identical or similar parts or elements are generally indicated by identical reference numerals.

Figure 3:
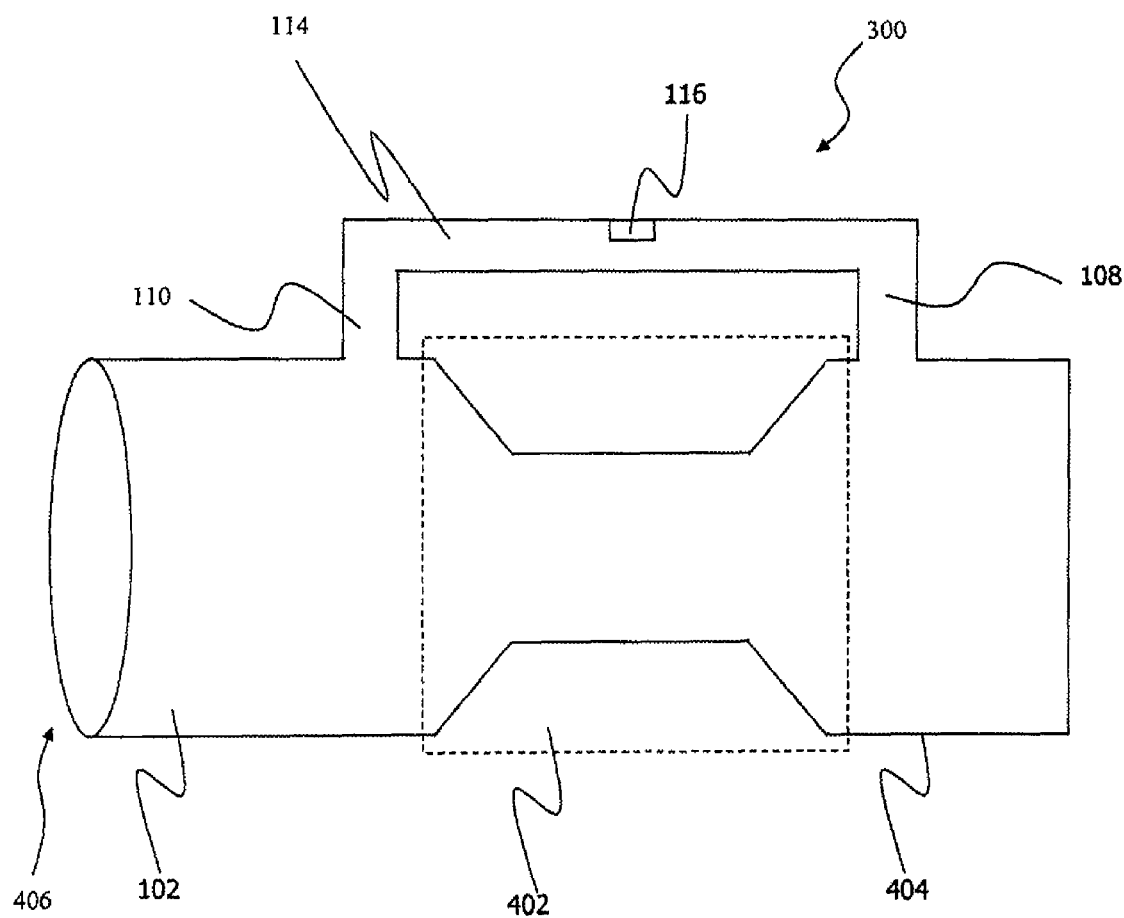
FIG. 3 illustrates an alternative embodiment of a venturi flow sensor with a venturi flow chamber and associated bypass flow chamber which exhausts downstream from the venturi region, in accordance with an alternative embodiment.

FIG. 3 illustrates a venturi flow system 300, which can be implemented in accordance with an alternative embodiment of the invention. Venturi flow system 300 consists of a cylindrically enclosed flow chamber 406 and a bypass chamber 114 connected to the cylindrically enclosed flow chamber 406 via taps 108 and 110. Bypass chamber 114 is equipped with flow sensor 116. Notice tap 108 exhausts bypass chamber 114 down stream from the venturi segment 402. In a preferred embodiment, flow sensor 116 is implemented as a MEMS flow sensor, but any suitable flow sensor may be utilized.

Figure 4:
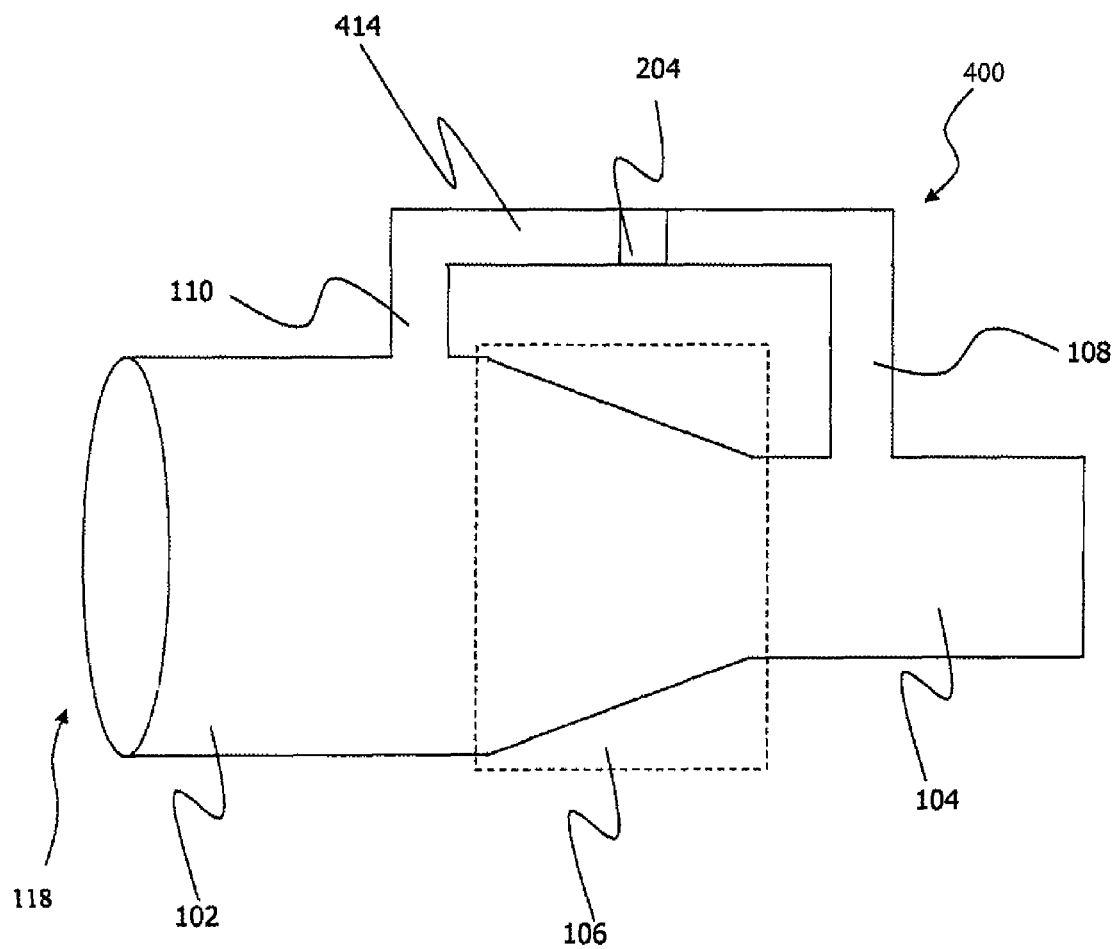
FIG. 4 illustrates a side view of a venturi flow sensor with a venturi flow chamber and an associated dead-ending pressure chamber which taps into the venturi flow chamber up stream and down stream from the venturi region, in accordance with an alternative embodiment.

FIG. 4 illustrates a side view of a venturi flow sensor 400, in accordance with an alternative embodiment. Venturi flow sensor 400 consists of a cylindrically enclosed flow chamber 118 and pressure chamber 414 connected to the cylindrically enclosed flow chamber 118 via taps 110 and 108.

Note that as depicted in FIG. 4, tap 108 exhausts pressure chamber 414 into cylindrically enclosed flow chamber 118 down stream from the venturi region 106. In addition, this embodiment of venturi flow sensor 400 includes a pressure sensor 204 included in pressure chamber 414. This allows a user to measure airflow of the system by correlating pressure difference to flow rate. Any number of commercially available pressure sensors may be used as pressure sensor 204.

Figure 5:
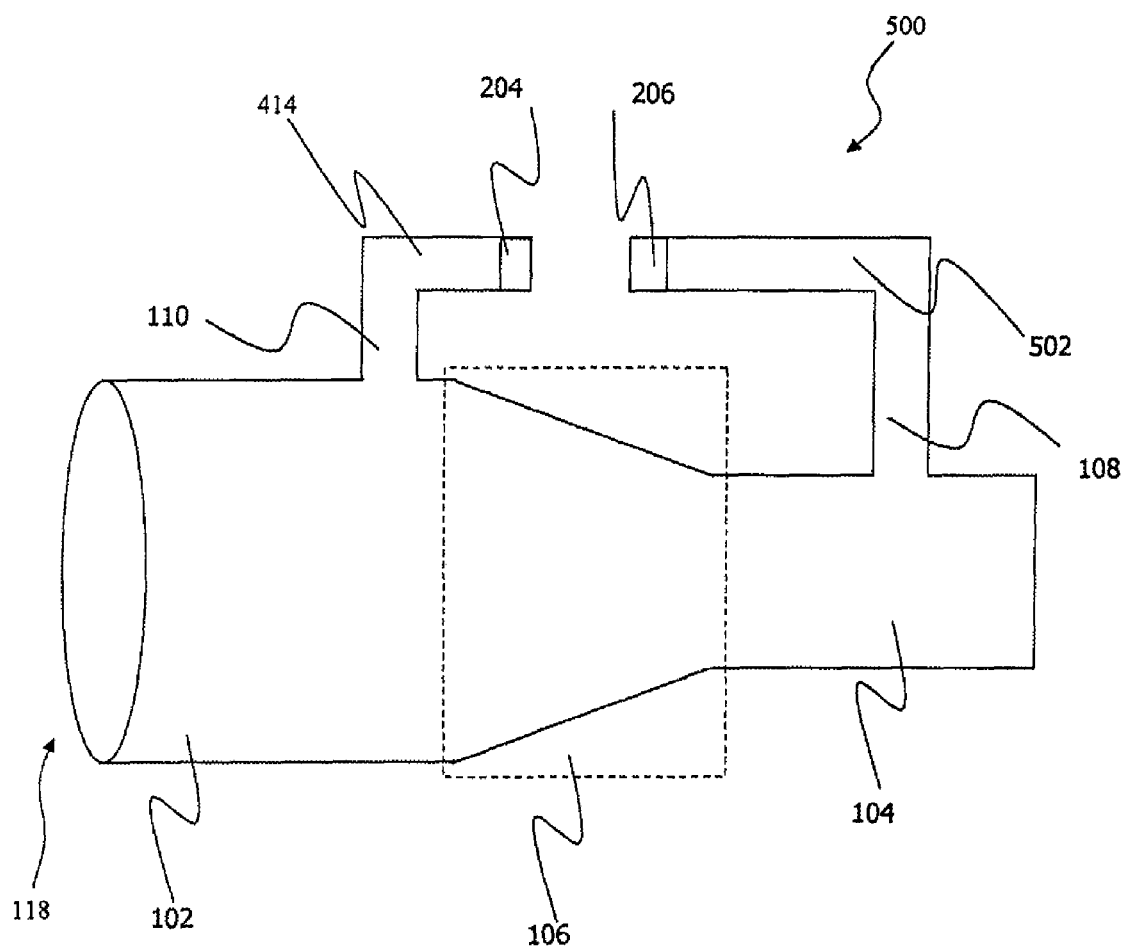
FIG. 5 illustrates a side view of a venturi flow sensor with a venturi flow chamber and associated dead-ending pressure chamber, in accordance with an alternative embodiment.

FIG. 5 illustrates a side view of a venturi flow sensor 500, which can be implemented in accordance with an alternative embodiment. Venturi flow sensor 500 includes a cylindrically enclosed flow chamber 118 and pressure chambers 414 and 502, which both dead end. Pressure sensors 204 and 206 are included in pressure chamber 414 and 502 allowing for the measurement of airflow in the system.

Figure 6:
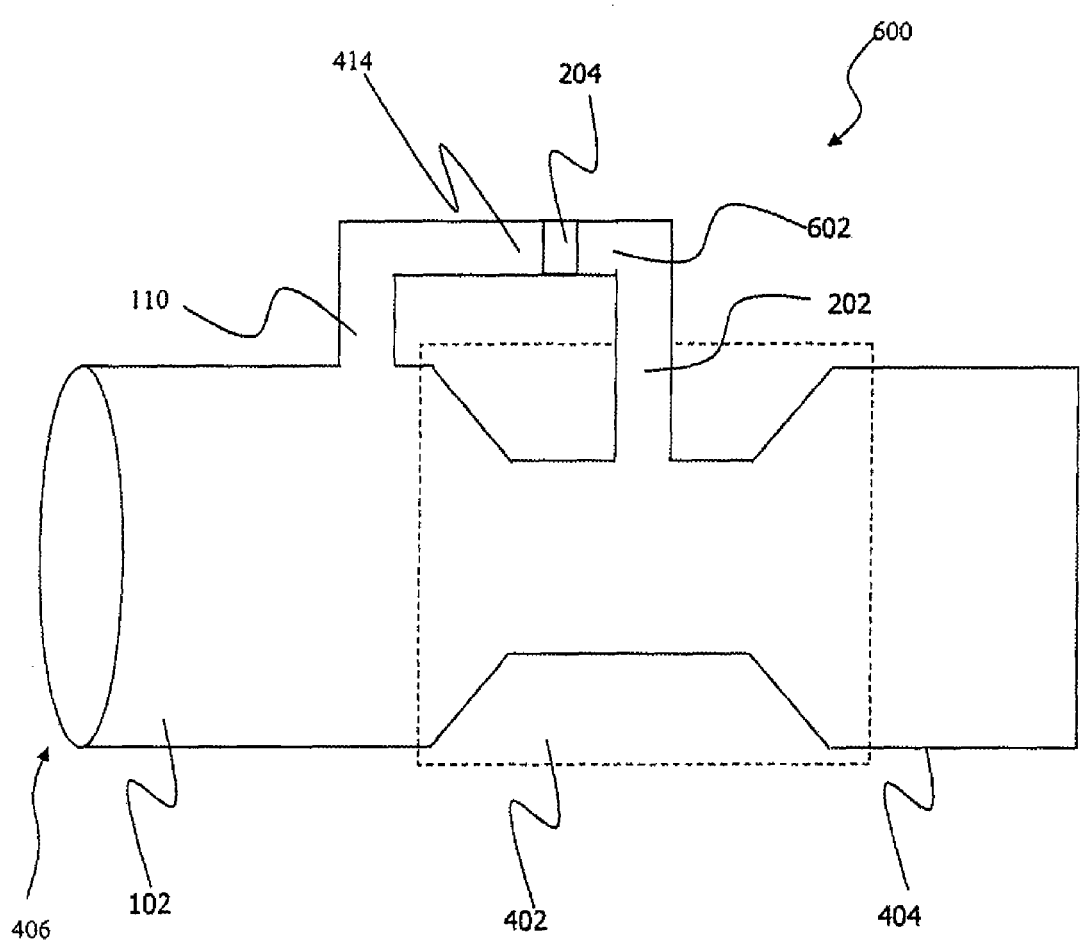
FIG. 6 illustrates a side view of a venturi flow sensor with a venturi flow chamber and associated dead-ending pressure chamber which taps into the venturi flow chamber up stream from the venturi region and in the venturi region, in accordance with an alternative embodiment.

FIG. 6 illustrates a side view of a venturi flow system 600 that may be implemented in accordance with an alternative embodiment. Venturi flow sensor 600 consists of a cylindrically enclosed flow chamber 406 and pressure chambers 414 and 602 which dead end at pressure sensor 204. Once again pressure sensor 204 is included in pressure chamber 414 and 602 allowing for the measurement of airflow of the system.

Figure 7:
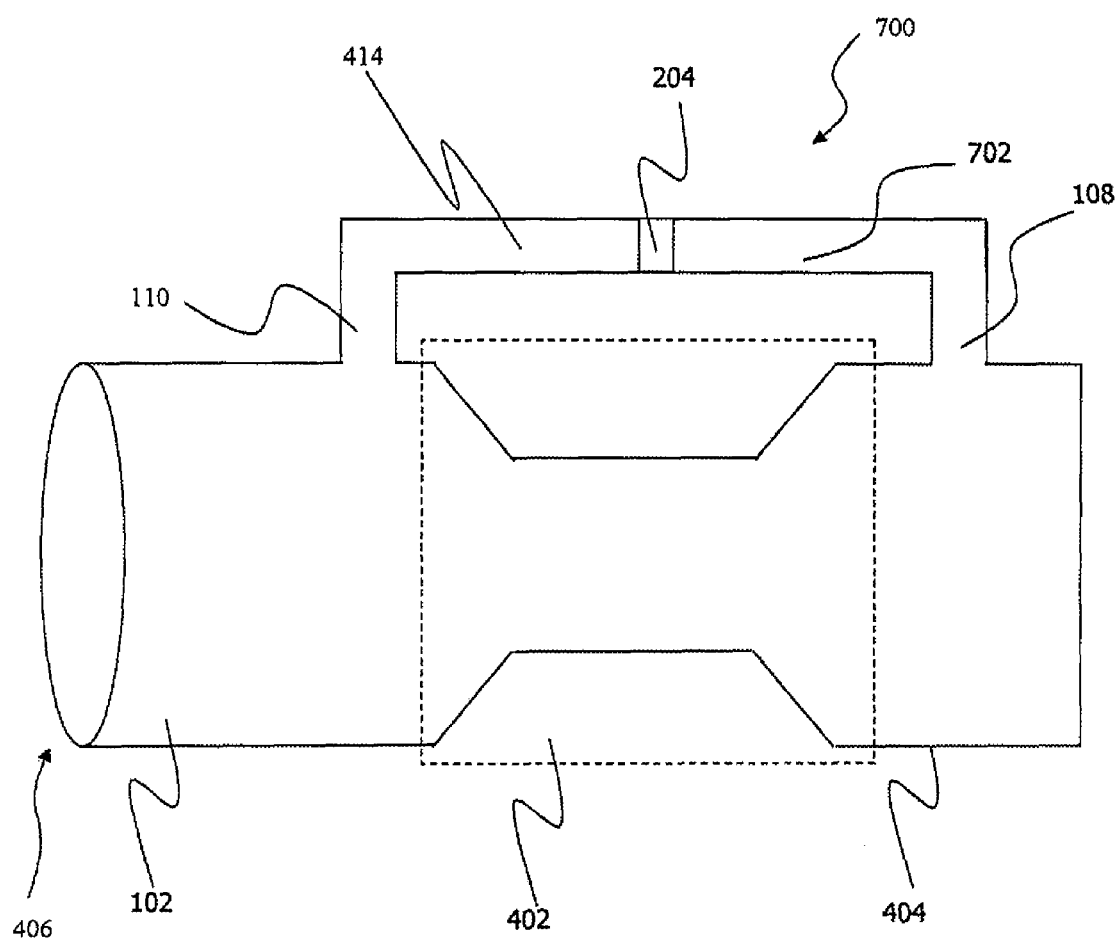
FIG. 7 illustrates a side view of a venturi flow sensor with a venturi flow chamber and associated dead-ending pressure chamber which taps into the venturi flow chamber up stream and down stream from the venturi region in accordance with an alternative embodiment.

FIG. 7 illustrates a side view of a venturi flow system 700 that may be implemented in accordance with an alternative embodiment. FIG. 7 is an adaptation of venturi flow system 600 wherein pressure chamber 602 has been replaced by pressure chamber 702. Venturi flow system 700 is designed such that tap 108 which services pressure chamber 702 is located downstream from venturi flow region 402. As in venturi flow system 600, pressure sensor 204 is included in pressure chambers 414 and 702 allowing for measurement of airflow of the system.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The embodiments of the invention in which an exclusive property or right is claimed are defined as follows. Having thus described the invention what is claimed is:

1. A method, comprising;
   providing a flow channel including a reduced diameter portion defining a venturi region;
   connecting a bypass flow channel to the flow channel, the bypass flow channel connected to the flow channel upstream of the venturi region via a first tap; and
   disposing a microeleetromechanical system (MEMS) based flow sensor in said bypass flow channel, said MEMS based flow sensor configured to measure a parameter of a fluid within the bypass flow channel.

2. The method of claim 1 wherein the bypass channel is connected to the flow channel downstream of the first tap via a second tap, and wherein said second tap is positioned at said tapered venturi region.

3. The method of claim 1 wherein the bypass channel is connected to the flow channel downstream of the first tap via a second tap, and wherein said second tap is positioned downstream from said venturi region.

4. The method of claim 1 wherein
said bypass flow channel includes pressure chamber.

5. The method of claim 4 wherein said MEMS based flow sensor:
includes a pressure sensor.

6. The method of claim 4 wherein said bypass flow channel has a dead end spaced from the first tap.

7. The method of claim 1 further comprising passing a fluid through said flow channel wherein said fluid is a gas.

8. The method of claim 1 further comprising passing a fluid run through said flow channel, wherein said fluid is a liquid.

9. A venturi flow system, comprising:
a flow channel including a first region having a first diameter, a second region having a second diameter that is smaller than the first diameter, and a third region positioned between the first region and the second region, the third region tapering from the first diameter to the second diameter and defining a venturi region;
a first tap connected to said flow channel upstream from said venturi region;
a second tap connected to said flow channel downstream of said first tap;
a bypass flow channel connected to the first tap and the second tap; and
a microelectromechanical system (MEMS) based flow sensor located within said bypass flow channel, the MEMS based flow sensor configured to measure a parameter of a fluid in said bypass flow channel.

10. The venturi flow system of claim 9 wherein said second tap connects said bypass flow channel to said flow channel in said venturi region.

11. The venturi flow system of claim 9 a wherein said second tap connects said bypass flow channel to said flow channel downstream from said venturi region.

12. The venturi flow system of claim 9 wherein said bypass flow channel includes a pressure chamber.

13. The venturi flow system of claim 12 wherein said MEMS based flow sensor includes a pressure sensor.

14. The venturi flow system of claim 13 wherein said bypass flow channel is fluidly sealed at a location between the first tap and the second tap to define a of said pressure chamber.

15. The venturi flow system of claim 9 wherein said fluid flow includes a gas.

16. The venturi flow system of claim 9 wherein said fluid flow includes a liquid.

17. A venturi flow sensing apparatus, comprising:
a flow channel including a tapered region defining venturi flow region;
a first tap connected to said flow channel on a first side of said venturi flow region;
a second tap connected to said flow channel, the second tap spaced a distance along the flow channel from said first tap;
a bypass flow channel coupled to and extending between the first tap and the second tap; and
a microelectromechanical system (MEMS) based sensor positioned in said bypass flow channel for measuring a parameter related to a flow in said flow channel.

18. The venturi flow sensor apparatus of claim 17 wherein said first tap is positioned upstream of the venture flow region, and said second tap is positioned at or downstream of said venturi flow region.

\* \* \* \* \*